United States Patent
Yokota et al.

(10) Patent No.: US 9,366,800 B2
(45) Date of Patent: Jun. 14, 2016

(54) EDGE LIGHT-TYPE BACKLIGHT DEVICE AND LIGHT DIFFUSION MEMBER

(71) Applicant: KIMOTO CO., LTD., Saitami-shi (JP)

(72) Inventors: Hiroshi Yokota, Saitama (JP); Masashi Takai, Saitama (JP)

(73) Assignee: KIMOTO CO., LTD., Saitama-Shi, Saitama (JP)

( * ) Notice: Subject to any disclaimer, the term of this patent is extended or adjusted under 35 U.S.C. 154(b) by 99 days.

(21) Appl. No.: 14/384,877

(22) PCT Filed: Mar. 26, 2013

(86) PCT No.: PCT/JP2013/058871
§ 371 (c)(1),
(2) Date: Sep. 12, 2014

(87) PCT Pub. No.: WO2013/146823
PCT Pub. Date: Oct. 3, 2013

(65) Prior Publication Data
US 2015/0029748 A1    Jan. 29, 2015

(30) Foreign Application Priority Data

Mar. 30, 2012 (JP) .................................. 2012-078592

(51) Int. Cl.
*F21V 7/04* (2006.01)
*F21V 8/00* (2006.01)
(Continued)

(52) U.S. Cl.
CPC ............ *G02B 6/0051* (2013.01); *G02B 5/0278* (2013.01); *G02B 5/045* (2013.01); *G02B 6/0053* (2013.01)

(58) Field of Classification Search
CPC .... G02B 6/0051; G02B 6/0053; G02B 5/045; G02B 5/0278; G02B 6/0031; G02B 6/0038; G02B 6/0068; G02B 6/0061; G02B 6/0036; G02F 1/133606

USPC .................................. 362/606–608, 620, 626
See application file for complete search history.

(56) References Cited

U.S. PATENT DOCUMENTS 6,606,133 B1 *  8/2003  Okabe .................. G02B 5/0215
                                                349/112
6,741,303 B1 *  5/2004  Okabe .................. G02B 5/0226
                                                349/113
(Continued)

FOREIGN PATENT DOCUMENTS

JP       09-127314 A    5/1997
JP       2004-163945 A  6/2004
(Continued)

OTHER PUBLICATIONS

International Search Report (ISR) dated Jul. 2, 2013, for PCT/JP2013/058871, and English translation thereof.
(Continued)

*Primary Examiner* — Anne Hines
*Assistant Examiner* — Jose M Diaz
(74) *Attorney, Agent, or Firm* — Bacon & Thomas, PLLC

(57) ABSTRACT

This edge light-type backlight device comprises a light guide plate, a light source disposed at one end part of the light guide plate, a light diffusion sheet and a prism sheet on a light emission face of the light guide plate. The refractive index of the prism sheet exceeds 1.60, a peak of emitted light distribution of the light emission face in a plane parallel to the one end part of the light guide plate and orthogonal to the light emission face is within an angle ranges of 30°~45° and −30°~−45° with respect to a normal direction of the light emission face. The emitted light of the light emission face diminishes toward an emission angle −90° or 90° with respect to the normal line from the angle ranges of the peak of the emitted light distribution. High frontal brightness and diffusion are realized.

16 Claims, 2 Drawing Sheets

(51) Int. Cl.
*G02B 5/02* (2006.01)
*G02B 5/04* (2006.01)

(56) References Cited

U.S. PATENT DOCUMENTS

| | | | |
|---|---|---|---|
| 8,114,499 B2* | 2/2012 | Hsu | G02B 5/0226 |
| | | | 428/143 |
| 9,110,245 B2* | 8/2015 | Derks | G02B 5/305 |
| 2002/0181111 A1* | 12/2002 | Okabe | G02B 6/0033 |
| | | | 359/599 |
| 2005/0200278 A1 | 9/2005 | Jones et al. | |
| 2007/0053080 A1* | 3/2007 | Harada | G02B 6/0056 |
| | | | 359/809 |

FOREIGN PATENT DOCUMENTS

| | | |
|---|---|---|
| JP | 2007-066880 A | 3/2007 |
| JP | 2008-503774 A | 2/2008 |
| JP | 2008-091287 A | 4/2008 |
| JP | 2010-231896 A | 10/2010 |

OTHER PUBLICATIONS

International Preliminary Report on Patentability (IPRP) dated Oct. 1, 2014, for PCT/JP2013/058871.

* cited by examiner

EDGE LIGHT-TYPE BACKLIGHT DEVICE AND LIGHT DIFFUSION MEMBER

TECHNICAL FIELD

The present invention relates to an edge light-type backlight device generally used in liquid crystal display devices and the like, and to a backlight device having high front side brightness and diffusing property compared with conventional backlight devices.

BACKGROUND ART

In recent years, color liquid crystal display devices have been used in various fields, such as notebook personal computers, desktop personal computers, tablet terminals, smartphones, portable telephones, PDAs, car navigation devices, PNDs, game devices, and portable music players. The color liquid crystal display device is provided with liquid crystal cells and a backlight. Example backlight structures include a direct structure where the light source is disposed immediately under the liquid crystal cells via a diffuser plate, and an edge light-type structure where the light source is disposed on the side of a light guide plate.

In such backlights, there are provided optical members such as a light diffusion sheet layered on the light-emitting surface of the light guide plate or diffuser plate for making the light from the light source uniform and a prism sheet for increasing the front side brightness (Patent Document 1).

Particularly in recent years, in the fields of tablet terminals, smartphones, portable telephones and the like, an environment enabling the viewing of higher definition pictures is available. In order to enable the viewing of the high-definition pictures, the liquid crystal pixels of the liquid crystal cells provided in the liquid crystal display device are becoming increasingly smaller. When such liquid crystal pixels are used, the transmittance of the light from the light source is markedly decreased compared with conventional art, resulting in poor front side brightness.

In order to overcome the decrease in front side brightness, improvements in optical members have been made (Patent Document 2). For example, in Patent Document 2, the prism sheet is designed with an increased refractive index compared with conventional art so as to increase the front side brightness.

Patent Document 1: JP-A-9-127314 (Claim 1, paragraph 0034)

Patent Document 2: JP-T-2008-503774

Patent Document 2 discloses a prism sheet having high refractive index (which may hereafter be referred to as "high refractive index prism sheet") and a display device using the same. However, the literature does not provide any concrete description as to the light diffusion sheet to be combined with the high refractive index prism sheet. The high refractive index prism sheet has emitting angle characteristics concerning the emission of the light incident on the prism sheet which are different from those of conventional prism sheets. Thus, if the conventional light diffusion sheet is simply used, the emitting angle characteristics of the high refractive index prism sheet cannot be sufficiently effectively utilized. As a result, the backlight device cannot provide sufficient front side brightness and diffusing property.

SUMMARY OF THE INVENTION

The purpose of the present invention is to provide an edge light-type backlight device that employs a light diffusion sheet capable of exhibiting high front side brightness and diffusing property adapted to the characteristics of the high refractive index prism sheet.

The present inventor conducted intensive studies on the above-described problem and discovered that high front side brightness and diffusing property as an edge light-type backlight device can be exhibited by controlling the peak of the emitted light distribution of emitted light of light incident on the light diffusion sheet, when used in combination with the high refractive index prism sheet, to be in a specific range, thus arriving at the present invention.

An edge light-type backlight device according to the present invention includes a light guide plate, a light source disposed at one end portion of the light guide plate, and a light diffusion sheet and a prism sheet successively disposed on a light-emitting surface of the light guide plate, and in the edge light-type backlight device, the prism sheet has a refractive index of more than 1.60; a peak of an emitted light distribution on the light-emitting surface of the light diffusion sheet in a plane parallel to the one end portion of the light guide plate and orthogonal to the light-emitting surface is in angular ranges of 30 to 45° and −30 to −45° with respect to a normal direction of the light-emitting surface; and emitted light from the light-emitting surface of the light diffusion sheet is gradually decreased from the angular ranges of the peak of the emitted light distribution toward an emitting angle of −90° or 90° with respect to the normal direction.

In the edge light-type backlight device according to the present invention, a ratio of change in an amount of emitted light in an angular range of −40 to 40° from the normal direction with respect to an amount of emitted light in the normal direction is preferably less than 30%.

In the edge light-type backlight device according to the present invention, the light diffusion sheet preferably includes a diffusion layer on one surface of a transparent resin film; and the diffusion layer includes a binder resin and particles with an average particle diameter of not more than 5 μm, the particles having a content ratio of 100 to 200 parts by weight with respect to 100 parts by weight of the binder resin.

In the edge light-type backlight device according to the present invention, preferably, the light diffusion sheet includes a back coat layer on a surface of the transparent resin film opposite to the surface on which the diffusion layer is provided, the back coat layer containing nylon resin particles and/or silicone resin particles.

A light diffusion member according to the present invention is disposed on a light guide plate of an edge light-type backlight device including the light guide plate and a light source disposed at one end portion of the light guide plate, and the light diffusion member includes a prism sheet and a light diffusion sheet, the prism sheet having a refractive index of more than 1.60; a peak of an emitted light distribution on the light-emitting surface of the light diffusion sheet in a plane parallel to the one end portion of the light guide plate and orthogonal to the light-emitting surface is in angular ranges of +30 to +45° and −30 to −45° with respect to a normal direction of the light-emitting surface; and emitted light from the light-emitting surface of the light diffusion sheet is gradually decreased from the angular range of the peak of the emitted light distribution toward an emitting angle of −90° or 90° with respect to the normal direction.

According to the present invention, an edge light-type backlight device having higher front side brightness and diffusing property than conventional edge light-type backlight devices is provided.

The edge light-type backlight device according to the present invention can efficiently increase the front side brightness and diffusing property, thus contributing to a decrease in electric power consumption of the liquid crystal display device.

DETAILED DESCRIPTION OF THE INVENTION

In the following, an embodiment of the edge light-type backlight device and a light diffusion member according to the present invention will be described. First, a light diffusion member used in the edge light-type backlight device will be described.

The light diffusion member according to the present invention includes a high refractive index prism sheet and a light diffusion sheet. In the edge light-type backlight device including a light guide plate and a light source disposed at one end portion of the light guide plate, the light diffusion sheet and the prism sheet are disposed in that order on the light guide plate.

In the light diffusion member according to the present invention, the prism sheet has a refractive index of more than 1.60. The peak of the emitted light distribution on the light-emitting surface of the light diffusion sheet in a plane parallel to the one end portion of the light guide plate at which the light source is disposed and orthogonal to the light-emitting surface is in angular ranges of −30 to −45° and 30 to 45° with respect to the normal direction of the light-emitting surface. The emitted light from the light-emitting surface of the light diffusion sheet is gradually decreased from the angular range of the peak of the emitted light distribution toward an emitting angle of −90° or 90° with respect to the normal direction.

In the following, each element of the light diffusion member 20, the prism sheet, and the light diffusion sheet will be described.

The prism sheet of the present invention has a refractive index of more than 1.60. While the refractive index of a prism sheet is generally on the order of 1.50 to 1.60, the prism sheet according to the present invention has a higher refractive index. By using such high refractive index, not only the light from the light guide plate can be efficiently caused to rise toward the front side direction, but also a backlight device having higher front side brightness and better diffusing property than conventional examples can be obtained in combination with the light diffusion sheet according to the present invention.

Figure 1:
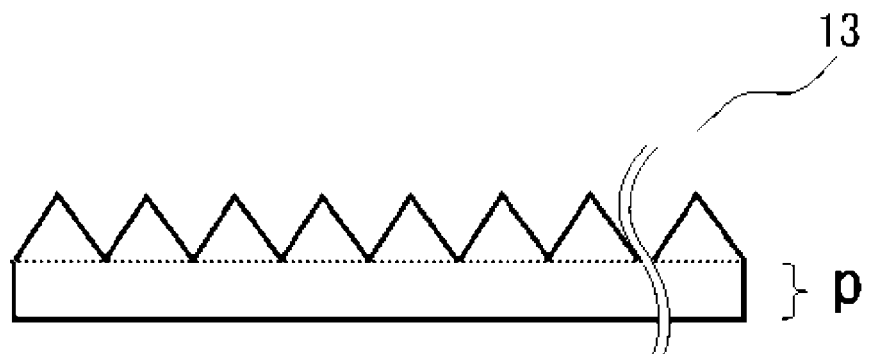
FIG. 1 is an enlarged cross sectional view of an embodiment of a prism sheet used in the present invention.

The prism sheet according to the present invention is configured such that a plurality of structural rows with substantially triangular cross section is arranged in parallel on one surface. Preferably, the structural rows with substantially triangular shape have a vertical angle in the range of 80 to 105°. The substantially triangular structural rows may be shaped such that the peak is sharp-pointed, or the top ends of the structural rows may have a slight R. FIG. 1 shows an example of the prism sheet.

Preferably, the structural rows have a peak-to-peak pitch in the range of 10 to 40 μm. Preferably, the structural rows have a peak height in the range of 5 to 20 μm.

The prism sheet of the present invention may include a single resin layer forming the substantially triangular structural rows, or include a flat support on which a resin layer forming the structural rows formed thereon.

In the latter case, the support may include a highly optically transparent plastic film, which may be similar to the one used as a support for the light diffusion sheet which will be described below. Preferably, among others, a polyethylene terephthalate film that has been subjected to orientation, particularly biaxial-orientation, may be used from the viewpoint of mechanical strength and dimension stability. Preferably, the support is provided with an easy adhesion process, such as a plasma process, a corona discharge process, or a far ultraviolet irradiation process, or formed with an undercoating easy adhesion layer.

For increasing the refractive index, the support may be formed by incorporating inorganic nanoparticles (inorganic particles with a particle diameter on the order of 1 to 100 nm) of aluminum oxide, zirconium oxide, titanium oxide, tin oxide, antimony oxide, silica and the like.

The thickness of the support is not particularly limited and may be selected as appropriate for the applied material. The thickness is generally 25 to 500 μm and preferably 50 to 300 μm.

The resin layer including the structural rows with the substantially triangular cross section may include mainly a polymer resin. Examples of the polymer resin are an ionizing radiation curable resin, a thermosetting resin, and a thermoplastic resin, and may be similar to those listed as binder resins used in the diffusion layer of the light diffusion sheet as will be described below.

The prism sheet according to the present invention has the refractive index of more than 1.60. Preferably, the resin layer as a single member has a refractive index (when provided with the support, the refractive index of the resin layer excepting the support) of more than 1.60. The refractive index may be adjusted to a desired refractive index by adding and dispersing inorganic nanoparticles similar to inorganic nanoparticles that may be added to the above-described support, to the extent that the optical transparency is not affected. In this case, it is preferable that the content of the inorganic nanoparticles is not more than 10% by weight of the total composition of the resin layer.

When the prism sheet according to the present invention is formed by a single resin layer, the thickness of the resin layer is preferably 25 to 300 μm from the viewpoint of obtaining sufficient coating film strength and smoothness of the layer. On the other hand, when the resin layer is formed on the support to provide the prism sheet, the preferable thickness is 1 to 10 μm. The thickness of the resin layer herein refers to the thickness of the resin portion where the structural rows are not formed (the portion indicated by sign p in FIG. 1).

The method of manufacturing the prism sheet according to the present invention is not particularly limited. For example, the prism sheet may be manufactured by cutting the resin layer using cutting technology employing a special tool such that the structural rows with the desired triangular cross section can be formed. Shape transfer technologies, such as 2P process (Photo-Polymer process), 2T process (Thermal-Transformation process), or embossing process, may also be used. With regard to shape transfer technology, a polymer resin and the like for constituting the above-described resin layer may be filled in a mold having a shape complementary to the required surface shape of the resin layer. After the shape pattern is transferred, the polymer resin and the like is cured and removed from the mold, whereby the prism sheet provided with the resin layer with the structural rows formed thereon can be obtained. On the other hand, when the support is used, polymer resin and the like are filled in a mold, and the support is placed thereon. Then, the polymer resin and the like is cured and removed from the mold, whereby the prism sheet provided with the resin layer with the structural rows formed on the support can be obtained. When the structural rows of the resin layer are formed by the 2P process, ionizing radiation curable resin is used. When the 2T process or embossing process is used to form the structural rows of the resin layer, thermosetting resin or thermoplastic resin is used.

Next, the light diffusion sheet combined with the above-described high refractive index prism sheet will be described. A conventional light diffusion sheet is designed such that, when assembled in an edge light-type backlight including a light guide plate and a light source, the peak of the emitted light distribution on the light-emitting surface of the light diffusion sheet in a plane parallel to the one end portion of the light guide plate at which the light source is disposed and orthogonal to the light-emitting surface is in deviated angular ranges such as less than −50° or exceeding 50° with respect to the normal direction of the light-emitting surface. When such conventional light diffusion sheet is combined with the high refractive index prism sheet with the enhanced effect of causing the light to rise upward toward the front side direction, sufficient front side brightness or diffusing property cannot be obtained.

On the other hand, in the light diffusion sheet according to the present invention, the peak of the emitted light distribution in the aforementioned plane is shifted to within the angular ranges of −30 to −45° and 30 to 45° with respect to the normal direction of the light-emitting surface. Further, the emitted light is gradually decreased from the aforementioned angular ranges toward the emitting angle of −90° or 90° with respect to the normal direction of the light-emitting surface, respectively. By using the light diffusion sheet having such specific emitting angle characteristics with the aforementioned high refractive index prism sheet with its optical directionality, a synergistic effect can be obtained, whereby a backlight device having diffusing property superior to conventional art while maintaining front side brightness can be provided.

Figure 2:
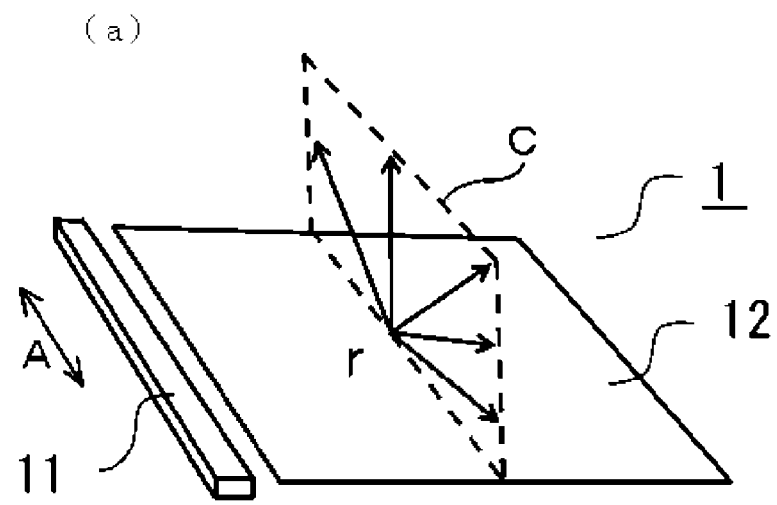
FIG. 2 illustrates an emission example of emitted light from a light diffusion sheet.
Figure 2:
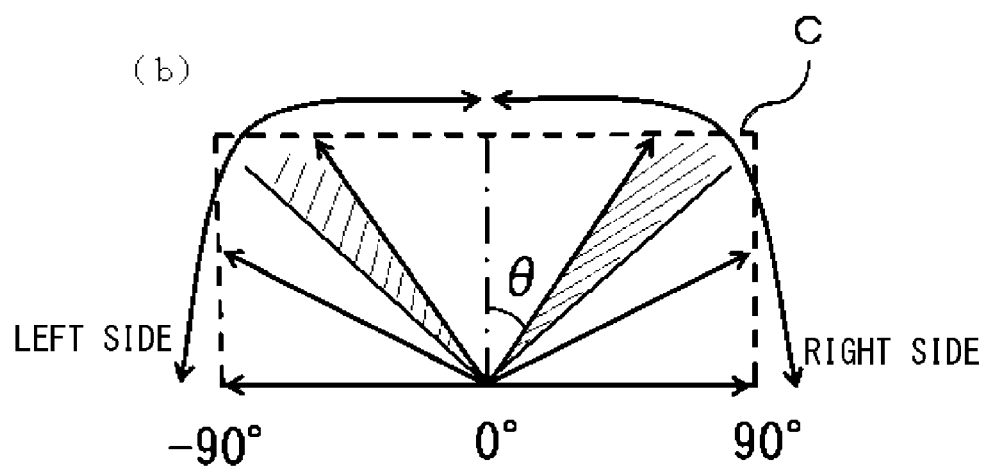

The emitting angle characteristics of the light diffusion sheet according to the present invention will be described further with reference to FIG. 2. As illustrated in FIG. 2(a), in a plane C passing an arbitrary point r on the light diffusion sheet 12, parallel to a longitudinal direction A of the light source 11 (or, when the light source includes a plurality of LED elements, the direction of their arrangement), and orthogonal to the light-emitting surface of the light diffusion sheet 12, the light emitted from the point r (emitted light) is dispersed and has mutual angles. The angle distribution of the emitted light is the emitted light distribution. FIG. 2(b) illustrates the cross section C. In FIG. 2(b), the normal direction with respect to the light-emitting surface of the light diffusion sheet 12 is taken as a reference (0 degree), and an angle θ formed by the normal direction and the emitted direction of the emitted light is taken as the emitting angle. For example, the emitting angles of the light emitted toward the left when the cross section C is viewed from the light source 11 side are defined as "−", while the emitting angles of the light emitted toward the right are defined as "+", with the portions from the normal direction to the light-emitting surface being designated as 0 to −90° or 0 to 90°, respectively. In the light diffusion sheet of the present invention, the angular ranges where the peak of the emitted light distribution in the cross section C is present (−30 to −45° and 30 to 45°) are indicated by hatching in the drawing.

In the foregoing, only the arbitrary point r on the light diffusion sheet 12 has been focused, the cross section C passing the point r has been defined, and the angles of the emitted light in that cross section have been described. However, this is for convenience's sake, and the emitted light distribution is similar at each position of the light diffusion sheet 12.

In addition to the above, in the light diffusion sheet according to the present embodiment, the ratio of change in the amount of emitted light in the angular range of −40 to 40° from the normal direction with respect to the amount of emitted light in the normal direction is less than 30%. This means that in the light diffusion sheet of the present invention, the emitted light distribution has relatively flat characteristics in both sides of the angular ranges including 0°, so that the emitted light emitted from the high refractive index prism sheet can be uniformly diffused in an angular range close to the front direction. Thus, superior diffusing property can be obtained while ensuring front side brightness. Preferably, the ratio of change is less than 15%.

The configuration of the light diffusion sheet for realizing the above-described emitted light distribution (emitting angle characteristics) will be described. The light diffusion sheet according to the present invention is provided with the diffusion layer including a binder resin and a diffusing agent. The light diffusion sheet may include a single diffusion layer, or it may include a support on which a diffusion layer is layered.

Examples of the diffusion layer binder resin include ionizing radiation curable resin, thermosetting resin, and thermoplastic resin.

An example of the ionizing radiation curable resin that may be used is a photopolymerizable prepolymer that can be cross-linked and cured by ionizing radiation (ultraviolet ray or electron beam) irradiation. A particularly preferable example of the photopolymerizable prepolymer that may be used is an acrylic prepolymer having two or more acryloyl groups in one molecule and that forms into a three-dimensional reticular structure by cross-linking and curing. Examples of the acrylic prepolymer that may be used include urethane acrylate, polyester acrylate, epoxy acrylate, melamine acrylate, polyfluoroalkyl acrylate, and silicone acrylate. These acrylic prepolymers may be used independently. It is preferable, however, to add a photopolymerizable monomer in order to increase cross-linking curability and to further increase the hardness of a lens layer.

Examples of the photopolymerizable monomer that may be used include one or more kinds of monofunctional acrylic monomers such as 2-ethylhexyl acrylate, 2-hydroxy ethylacrylate, 2-hydroxy propyl acrylate, or butoxyethyl acrylate; bifunctional acrylic monomers such as 1,6-hexane dioldiacrylate, neopentylglycol diacrylate, diethylene glycol diacrylate, polyethylene glycol diacrylate, or hydroxypivalic acid ester neopentylglycol diacrylate; and multifunctional acrylic monomers such as dipentaerythritol hexaacrylate, trimethyl propanetriacrylate, or pentaerythritol triacrylate.

In addition to the above-described photopolymerizable prepolymer and photopolymerizable monomer, it is preferable to use additives such as photopolymerization initiator or photopolymerization accelerator when curing is performed using ultraviolet ray irradiation.

Examples of the photopolymerization initiator include acetophenone, benzophenone, Michler's ketone, benzoin, benzylmethyl ketal, benzoyl benzoate, α-acyloxime ester, and thioxanthones.

The photopolymerization accelerator decreases polymerization defects by air during curing and accelerates cure speed. Examples are p-dimethylamino benzoic acid isoamyl ester, and p-dimethylamino benzoic acid ethyl ester.

Examples of the thermosetting resin include silicone-based resin, phenol-based resin, urea-based resin, melamine-based resin, furan-based resin, unsaturated polyester-based resin, epoxy-based resin, diallyl phthalate-based resin, guanamine-based resin, ketone-based resin, aminoalkyd-based resin, urethane-based resin, acrylic resin, and polycarbonate-based resin. While these may be used independently, it is preferable to add a curing agent in order to further increase the cross-linkability and hardness of the cross-linking curable coating film.

Examples of the curing agent that may be used include compounds such as polyisocyanate, amino resin, epoxy resin, and carboxylic acid in accordance with the used resin.

Examples of the thermoplastic resin include ABS resin, norbornene resin, silicone-based resin, nylon-based resin, polyacetal-based resin, polycarbonate-based resin, denatured polyphenylene ether resin, polybutylene terephthalate, polyethylene terephthalate, sulfone-based resin, imide-based resin, fluorine-based resin, styrene-based resin, acrylic resin, vinyl chloride-based resin, vinyl acetate-based resin, vinyl chloride-vinyl acetate copolymer-based resin, polyester-based resin, urethane-based resin, nylon-based resin, rubber-based resin, polyvinyl ether, polyvinyl alcohol, polyvinyl butyral, polyvinyl pyrrolidone, and polyethylene glycol.

Among the above thermosetting resins or thermoplastic resins, it is preferable to use an acrylic resin thermosetting resin or thermoplastic resin from the viewpoint of coating film strength of the formed resin layer or of achieving high transparency. The thermosetting resins or thermoplastic resins may be used as a composite resin combining a plurality of types of the thermosetting resins or the thermoplastic resins.

Examples of the particles include inorganic particles such as silica, clay, talc, calcium carbonate, calcium sulfate, barium sulfate, aluminum silicate, titanium oxide, synthetic zeolite, alumina, and smectite; and resin particles such as styrene resin, urethane resin, nylon resin, benzoguanamine resin, silicone resin, and acrylic resin. Among others, it is preferable to use resin particles from the viewpoint of increasing brightness performance. Particularly, it is preferable to use resin particles including acrylic resin. These particles may be used not just in one type but also in combination of a plurality of types. The "inorganic particles" herein differ from the aforementioned "inorganic nanoparticles" in average particle diameter.

Preferably, the particles have an average particle diameter of 1 to 10 μm. Particularly, the average particle diameter of 1 to 5 μm is preferable. When the diffusion layer contains such particles with a relatively small average particle diameter, the unique emitting angle characteristics of the light diffusion sheet according to the present invention as indispensable performance can be more readily exhibited.

The shape of the particles is not particularly limited. However, spherical particles are preferable. Preferably, the particles has a variation coefficient of the particle diameter distribution on the order of 5 to 55% from the viewpoint of facilitating the acquisition of the above-described desired emitting angle characteristics of the light diffusion sheet according to the present invention. More preferably, the variation coefficient is 10 to 30%. The average particle diameter of the particles and the variation coefficient of the particle diameter distribution described above are measured by the Coulter counter method (weight distribution).

Preferably, from the viewpoint of facilitating the acquisition of the above-described desired emitting angle characteristics while achieving the required diffusing property, the content ratio of the particles with respect to the binder resin is 100 to 200 parts by weight with respect to 100 parts by weight of the binder resin. More preferably, the content ratio is 125 to 200 parts by weight as a lower limit, from the viewpoint of further increasing the diffusing property.

In the diffusion layer, surfactants such as a leveling agent or an antifoaming agent, or additives such as antioxidant, ultraviolet ray absorbing agent and the like may be added, in addition to the above-described binder resins or particles described above.

The thickness of the diffusion layer is preferably 10 to 500 μm and more preferably 10 to 250 μm when the light diffusion sheet of the present invention is composed of a single diffusion layer. When the thickness is 10 μm or more, sufficient coating film strength and good handling can be obtained. When the thickness is not more than 500 μm, high diffusion layer transparency can be obtained. When the diffusion layer is formed on the support, the thickness is preferably 5 to 60 μm and more preferably 7 to 30 μm from the viewpoint of facilitating the acquisition of the desired emitting angle characteristics of the present invention while ensuring light diffusing performance. The thickness of the diffusion layer refers to the thickness from the tip of the convex portion of the uneven surface of the diffusion layer to the surface on the opposite side to the uneven surface.

When the light diffusion sheet of the present invention includes the support, the support is not particularly limited so far as it is a highly optically transparent plastic film. Examples that may be used include polyethylene terephthalate, polybutylene terephthalate, polyethylene naphthalate, polycarbonate, polyethylene, polypropylene, polystyrene, triacetylcellulose, acrylic, polyvinyl chloride, and norbornene compound. Among others, a polyethylene terephthalate film that has been subjected to orientation, particularly biaxial-orientation, is preferable because of its high mechanical strength or dimension stability. Preferably, in order to achieve enhanced adhesive property with the diffusion layer, the surface may be subjected to corona discharge process or provided with an easy adhesion layer. Preferably, the thickness of the support is normally on the order of 10 to 400 μm.

The side opposite to the uneven surface of the light diffusion sheet of the present invention may be subjected to a fine matte process for preventing adhesion with other members, or to an anti-reflection process for increasing the light transmittance. Further, a back coat layer, an antistatic layer, or an adhesive layer may be provided by a coating/drying method described below.

The back coat layer has the basic function of preventing adhesion with the opposed member, and may be provided with scratch resistance with respect to the opposed member, or with diffusing property. The back coat layer has an unevenly shaped surface and may include a binder resin, particles and the like. The binder resin and particles may be similar to the binder resin and particles used in the diffusion layer of the above-described light diffusion sheet. Preferably, appropriate material is used in appropriate amounts in accordance with the function provided to the back coat layer.

Of the particles listed for the diffusion layer, nylon resin particles and/or silicone resin particles are preferable from the following viewpoint.

When nylon resin particles are used in the back coat layer, wear or scratches to the light guide plate that may be caused by the rubbing of the light diffusion sheet and the light guide plate as they are closely contacted during the use of the backlight device can be prevented.

When silicone resin particles are used in the back coat layer, scratches to the light guide plate that may be caused by the light diffusion sheet and the light guide plate closely contacting each other when the backlight device is pressed by a finger or the like can be effectively prevented. Preferably, the silicone resin particles have a dual structure such that a spherical core portion of silicone rubber is coated by a silicone resin film.

The resin particles may be used not just independently but also in combinations as needed.

Preferably, the nylon resin particles and silicone resin particles have an average particle diameter of 1 to 10 µm.

The content ratio of the particles with respect to the binder resin in the back coat layer cannot be definitively specified because it may differ depending on the required performance. Preferably, however, from the viewpoint of preventing adhesion with other members, the content ratio of the particles is 0.1 to 2 parts by weight with respect to 100 parts by weight of the binder resin.

Particularly, from the viewpoint of preventing the above-described wear or scratches during adhesion with the light guide plate, it is preferable to use a thermosetting resin with the glass transition temperature Tg of 15 to 100° C. as the binder resin, and to contain 0.5 to 2 parts by weight of nylon resin beads with respect to 100 parts by weight of the thermosetting resin.

From the viewpoint of preventing scratches upon application of pressure as described above, it is particularly preferable that 0.1 to 2 parts by weight of the silicone resin particles are contained with respect to 100 parts by weight of the thermosetting resin.

Preferably, the thickness of the back coat layer is 1 to 6 µm. Additives such as a dispersing agent, an antistatic agent, or a leveling agent may be contained as needed.

The back coat layer may be provided with diffusing property in addition to the anti-adhesion property, as described above. In this case, it is preferable that the haze of the diffusing back coat layer be lower than the haze of the diffusion layer from the viewpoint of increasing the light diffusing property while maintaining front side brightness. Specifically, the haze is preferably on the order of 50% to 70%. Preferably, with regard to the content ratios of the binder resin and the particles in the diffusing back coat layer, the ratio of the particles is decreased compared with the content ratio of the binder resin and particles in the diffusion layer, from the viewpoint of preventing a decrease in front side brightness.

The light diffusion sheet of the present invention may be fabricated by coating the support with a coating liquid, such as a diffusion layer coating liquid in which the above-described materials like the binder resin and particles are dissolved in an appropriate solvent, or a back coat layer coating liquid provided as needed, by a conventional, well-known method, such as bar coating, blade coating, spin coating, roll coating, gravure coating, flow coating, die coating, spraying, or screen printing, and then drying. The light diffusion sheet including a single diffusion layer may also be provided by peeling and removing the support from the diffusion layer formed on the support.

Next, the edge light-type backlight device according to the present invention will be described. The backlight device according to the present invention includes a light guide plate and a light source disposed at one end portion of the light guide plate. Further, as described above, a light diffusion sheet and a prism sheet are successively disposed on a light-emitting surface of the light guide plate. The light diffusion member composed of the light diffusion sheet and the prism sheet is the above-described light diffusion member according to the present invention.

Figure 3:
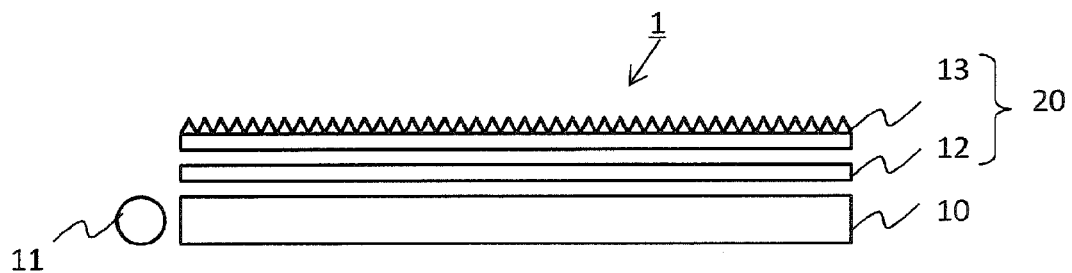
FIG. 3 is a cross sectional view schematically illustrating an embodiment of an edge light-type backlight device according to the present invention.

In the following, an embodiment of the edge light-type backlight device according to the present invention will be described with reference to the drawings. FIG. 3 illustrates the embodiment of the edge light-type backlight device. In a main configuration, the backlight device is provided with a light guide plate 10, a light source 11 disposed at one end portion of the light guide plate, and a light diffusion member 20 disposed on the light guide plate 10. The light diffusion member 20 includes a light diffusion sheet 12 and a prism sheet 13. While in FIG. 3 one each of the light diffusion sheet 12 and the prism sheet 13 is used, each sheet may include a plurality of overlapping sheets.

The light guide plate 10 includes an approximately flat plate molded such that at least one side provides a light incident plane, with a surface approximately orthogonal to the light incident plane providing a light-emitting surface. The light guide plate 10 mainly includes a matrix resin selected from highly transparent resins, such as polymethylmethacrylate, polycarbonate, or amorphous olefin-based resin. As needed, resin particles having a different refractive index from that of the matrix resin may be added. The respective surfaces of the light guide plate may not be uniformly flat and may have a complex surface shape, or may be provided with a diffusive print, such as a dot pattern.

The light source 11 is disposed at least at one end portion of the light guide plate 10, and may use mainly a cold cathode tube, an LED light source or the like. The shape of the light source may be point-like, linear, or L-shaped, for example. When an LED light source, particularly a high-brightness LED light source with the luminosity on the order of 1000 to 2000 mcd is used as the light source, it is difficult to strike a balance between the front side brightness and light diffusing property of the backlight device. However, in this case too, the combination of the prism sheet and the light diffusion sheet according to the present invention provides a superior balance between front side brightness and light diffusing property.

In addition to the above-described prism sheet, light diffusion sheet, light guide plate, and light source, the edge light-type backlight device may be provided with a reflecting plate, a polarizing film, an electromagnetic wave shield film and the like, depending on the purpose.

EXAMPLES

In the following, the present invention will be further described with reference to examples, where "parts" and "%" are based on the weight unless otherwise noted.

1. Fabrication of Light Diffusion Sheet

Example 1

After the diffusion layer coating liquid according to the following formula was mixed and stirred, the diffusion layer coating liquid was applied, by bar coating method, to a support consisting of a polyethylene terephthalate film (Lumirror T60: Toray Industries, Inc.) with a thickness of 25 µm and dried, such that the thickness after drying was 7 µm, thereby forming the diffusion layer. Then, the back coat layer coating liquid according to the following formula was applied, by bar coating method, to an opposite surface to the surface of the support on which the diffusion layer was formed, and dried such that the thickness after drying was 4 µm, thereby forming the back coat layer. In this way, the light diffusion sheet according to Example 1 was obtained.

<Diffusion Layer Coating Liquid for Example 1>

| | |
|---|---|
| acrylic polyol | 10 parts |
| (Acrydic A-807: DIC Corporation, solid content 50%) | |
| isocyanate-based curing agent | 2 parts |
| (Takenate D110N: Mitsui Chemicals, Inc., solid content 60%) | |
| polymethylmethacrylate spherical particles | 10 parts |
| (average particle diameter 2 μm, variation coefficient 20%) | |
| diluting solvent | 30 parts |

<Back Coat Layer Coating Liquid for Example 1>

| | |
|---|---|
| acrylic polyol | 10 parts |
| (Acrydic A-807: DIC Corporation, solid content 50%) | |
| isocyanate-based curing agent | 2 parts |
| (Takenate D110N: Mitsui Chemicals, Inc., solid content 60%) | |
| nylon resin particle | 0.1 parts |
| (Ganzpearl GPA-550: Ganz Chemical Co., Ltd., average particle diameter 5 μm) | |
| diluting solvent | 38 parts |

Example 2

The light diffusion sheet according to Example 2 was obtained in the same way as in Example 1 with the exception that, of the back coat layer coating liquid for Example 1, the nylon resin particles were changed to silicone resin particles (average particle diameter 2 μm) and its parts by weight changed to 0.06 parts.

Example 3

The light diffusion sheet according to Example 3 was obtained in the same way as in Example 1 with the exception that, of the diffusion layer coating liquid for Example 1, the polymethylmethacrylate spherical particles were changed to polymethylmethacrylate spherical particles (Chemisnow KMR-3TA: Soken Chemical & Engineering Co., Ltd., average particle diameter 3 μm, variation coefficient 30%).

Comparative Example 1

The light diffusion sheet according to Comparative Example 1 was obtained in the same way as in Example 1 with the exception that the diffusion layer coating liquid for Example 1 was changed to the following diffusion layer coating liquid, and that the diffusion layer was formed to have a thickness after drying of 10 μm.

<Diffusion Layer Coating Liquid for Comparative Example 1>

| | |
|---|---|
| acrylic polyol | 10 parts |
| (Acrydic A-807: DIC Corporation, solid content 50%) | |
| isocyanate-based curing agent | 2 parts |
| (Takenate D110N: Mitsui Chemicals, Inc., solid content 60%) | |
| polymethylmethacrylate spherical particle | 7 parts |
| (average particle diameter 8 μm, variation coefficient 20%) | |
| diluting solvent | 32 parts |

Comparative Example 2

The light diffusion sheet according to Comparative Example 2 was obtained in the same way as in Example 1 with the exception that the diffusion layer coating liquid for Example 1 was changed to the following diffusion layer coating liquid, and that the diffusion layer was formed to have a thickness after drying of 7 μm.

<Diffusion Layer Coating Liquid for Comparative Example 2>

| | |
|---|---|
| acrylic polyol | 10 parts |
| (Acrydic A-807: DIC Corporation, solid content 50%) | |
| isocyanate-based curing agent | 2 parts |
| (Takenate D110N: Mitsui Chemicals, Inc., solid content 60%) | |
| polymethylmethacrylate spherical particle | 5 parts |
| (Chemisnow KMR-3TA: Soken Chemical & Engineering Co., Ltd., average particle diameter 3 μm, variation coefficient 30%) | |
| diluting solvent | 25 parts |

2. Evaluation (1) Emitting Angle Characteristics of Light Diffusion Sheet (not Including Prism Sheet)

The light diffusion sheets according to Examples 1 to 3 and Comparative Examples 1 and 2 were assembled in a 4-inch edge light-type backlight device (containing eight LED light sources with luminosity 1300 mcd and a polycarbonate light guide plate with thickness 0.5 mm), with the back coat layer of the light diffusion sheet facing the light guide plate of the backlight device. Thus, the backlight devices using the light diffusion sheets according to Examples 1 to 3 and Comparative Examples 1 and 2 were fabricated, and the emitting angle characteristics of the backlight devices were measured. The measurement results are shown in Table 1. Table 1 also shows the emitting angle at which the amount of irradiation was the highest for each sheet when the emitting angle was between −90 to 0° and when between 0 to 90°, and the maximum ratio of change in the amount of emitted light in the angular range of −40 to 40° from the normal direction with respect to the amount of emitted light in the normal direction.

TABLE 1

| | Amount of irradiation at each emitting angle (cd/m$^2$) | | | | | |
|---|---|---|---|---|---|---|
| Emitting angle (°) | −75 | −60 | −45 | −30 | −15 | 0 |
| Example 1 | 1646 | 1696.4 | 1983 | 2098.1 | 2040.5 | 1925.6 |
| Example 2 | 1639 | 1671.3 | 2014.8 | 2107.4 | 2039.1 | 1944.3 |
| Example 3 | 1547 | 1582.2 | 1925.6 | 2040.5 | 1983 | 1868.2 |
| Comparative Example 1 | 1505 | 1525.2 | 1810.9 | 1468.3 | 1127.9 | 958.6 |
| Comparative Example 2 | 1535 | 1582.2 | 1582.2 | 1127.9 | 846 | 733.7 |

TABLE 1-continued

| Emitting angle (°) | Amount of irradiation at each emitting angle (cd/m²) | | | | | Maximum emitting angle (°) | | Maximum change ratio (%) |
|---|---|---|---|---|---|---|---|---|
| | 15 | 30 | 45 | 60 | 75 | Between −90 to 0° | Between 0 to 90° | |
| Example 1 | 2040.5 | 2098.1 | 1983 | 1753.6 | 1702 | −35.2 | 33.9 | 8.2 |
| Example 2 | 2052.9 | 2104.2 | 2002.1 | 1785.2 | 1710 | −34.9 | 34.5 | 6.7 |
| Example 3 | 1983 | 2040.5 | 1868.2 | 1582.2 | 1557 | −36 | 33.7 | 5.8 |
| Comparative Example 1 | 1127.9 | 1468.3 | 1753.6 | 1411.4 | 1401 | −47 | 47.8 | 45.4 |
| Comparative Example 2 | 789.8 | 1127.9 | 1582.2 | 1468.3 | 1434 | −51.4 | 51.7 | 50.1 |

3. Fabrication of Backlight Device

Thereafter, a first prism sheet (TBEF2-GT: Sumitomo 3M Limited) with a thickness of 65 μm was laid over the diffusion layer of the light diffusion sheet of the backlight device, with the surface of the prism sheet opposite to the prism plane facing the diffusion layer. Further, a second prism sheet (TBEF2-GM: Sumitomo 3M Limited) with a thickness of 68 μm was laid with the surface of the second prism sheet opposite to its prism plane facing the prism plane of the first prism sheet, thus fabricating the backlight devices according to Examples 1 to 3 and Comparative Examples 1 and 2. The two prism sheets were disposed with the ridge lines of their respective structural rows being orthogonal to each other.

4. Evaluation (1) Front Side Brightness

Figure 4:
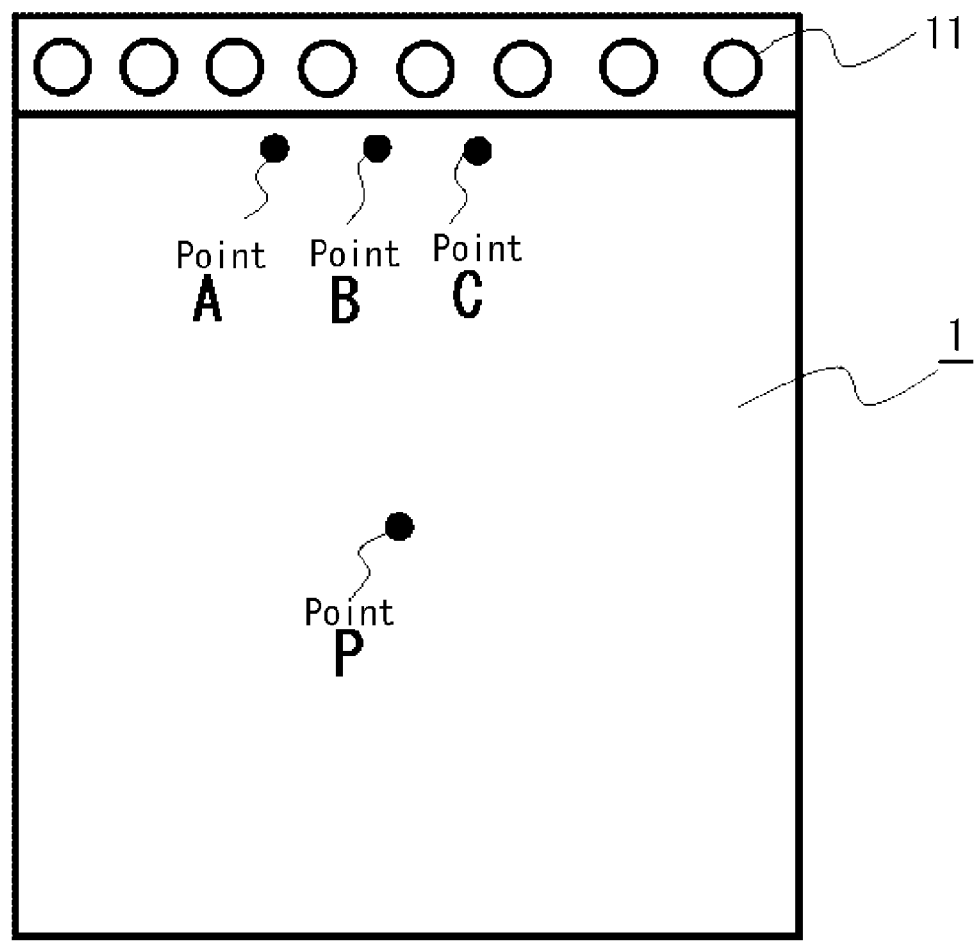
FIG. 4 is a reference view supplementing an evaluation method according to the present invention.

The backlight devices according to Examples 1 to 3 and Comparative Examples 1 and 2 were lighted, and the front side brightness at point P near the center of the light-emitting surface of the backlight 5 as shown in FIG. 4 was measured. The measurement results are shown in Table 2 (the unit is "cd/m²").

(2) Light Diffusing Property (Optical Uniformity of the Backlight as a Whole)

With regard to the backlight devices according to Examples 1 to 3 and Comparative Examples 1 and 2, the front side brightness at points A to C (each of which is positioned between two adjacent light sources 11) near the light source 11 as shown in FIG. 4 was measured. Then, the change of the front side brightness between points P and A (the ratio of the front side brightness at point A divided by the front side brightness at point P). Similarly, the change of the front side brightness between points P and B, and the change of the front side brightness between points P and C were calculated, and an average value (optical uniformity of the backlight as a whole) of the three changes was calculated. The measurement results of the front side brightness at points A to C and point P are shown in Table 2. The calculation results of the respective changes between the points P and A, between points P and B, and between points P and C and their average values (optical uniformity of the backlight as a whole) are shown in Table 3.

TABLE 2

| | Front side brightness (cd/m²) | | | |
|---|---|---|---|---|
| | Point A | Point B | Point C | Point P |
| Example 1 | 6364 | 6385 | 6404 | 7144 |
| Example 2 | 6360 | 6370 | 6397 | 7132 |
| Example 3 | 6232 | 6292 | 6317 | 7117 |
| Comparative Example 1 | 5845 | 5861 | 5867 | 7117 |
| Comparative Example 2 | 6070 | 6135 | 6182 | 7587 |

TABLE 3

| | Change in front side brightness (%) | | | |
|---|---|---|---|---|
| | Between points P and A | Between points P and B | Between points P and C | Average value (%) |
| Example 1 | 89.1 | 89.4 | 89.6 | 89.4 |
| Example 2 | 89.2 | 89.3 | 89.7 | 89.4 |
| Example 3 | 87.6 | 88.4 | 88.8 | 88.3 |
| Comparative Example 1 | 82.1 | 82.4 | 82.4 | 82.3 |
| Comparative Example 2 | 80.4 | 81.3 | 81.9 | 81.2 |

As will be seen from the results of Table 1, when the light diffusion sheets according to Examples 1 to 3 were assembled in the backlight device, the peak of the emitted light distribution on the light-emitting surface of the light diffusion sheet in the plane parallel to the one end portion of the light guide plate and orthogonal to the light-emitting surface was within the angular ranges of 30 to 45° and −30 to −45° with respect to the normal direction of the light-emitting surface, and the emitted light from the light-emitting surface of the light diffusion sheet was gradually decreased from the angular ranges of the peak of the emitted light distribution toward the emitting angle of −90° or 90° with respect to the normal direction. Further, as shown in Tables 2 and 3, the edge light-type backlight devices according to Examples 1 to 3, which included the light diffusion sheet with such emitting angle characteristics combined with the high refractive index prism sheet with the refractive index exceeding 1.60, exhibited high front side brightness while ensuring diffusing property.

When a light diffusion sheet including a light diffusion layer similar to the light diffusion layer of the light diffusion sheets according to Examples 1 to 3 and not including the back coat layer was fabricated and its emitting angle characteristics were similarly measured, substantially similar results to those of the light diffusion sheets according to Examples 1 to 3 were obtained.

Because the backlight devices according to Examples 1 and 3 used nylon resin particles in the back coat layer of the light diffusion sheet, the backlight devices exhibited superior anti-wear/scratch property as measured by the following test method.

<Anti-Wear/Scratch Property Test>

In accordance with JIS-H8682-1:1999, an abrasion resistance test was performed using an abrasion testing machine (NUS-ISO-1: Suga Test Instruments Co., Ltd.). In the abrasion resistance test, the diffusion layer surface of the light diffusion sheets according to Examples 1 and 3 was affixed on the rotating wheel of the testing machine. Then, a polycarbonate plate, which is the same material as the light guide plate, with a thickness of 1 mm was disposed on the back coat layer of the light diffusion sheet and reciprocated 15 times with the load of 300 gf. After the test, when the polycarbonate plate was visually observed, no scratches were formed in the polycarbonate plate.

Because the backlight devices according to Example 2 used silicone resin particles in the back coat layer of the light diffusion sheet, the backlight devices exhibited superior anti-scratch property when pressurized by the following test method.

<Anti-Scratch Property Test by Pressurization>

The back coat layer surface of the light diffusion sheet according to Example 2 was closely contacted on a polycarbonate plate with a thickness of 1 mm, and an anti-scratch property test by pressurization was implemented using a surface property testing machine (HEIDON-14: Shinto Scientific Co., Ltd.) from above the diffusion layer of the light diffusion sheet. During the test, a load member (material) with a cross sectional area of 1 cm$^2$ was closely contacted on the diffusion layer of the light diffusion sheet and pressurized with a load weight of 1500 g for 10 seconds. Thereafter, when the polycarbonate plate was visually observed at the location where the load was applied, no dents or the like were observed and no scratches were discovered on the polycarbonate plate.

Meanwhile, in the backlight device according to Comparative Examples 1 and 2, the peak of the emitted light distribution on the light-emitting surface of the light diffusion sheet in the direction parallel to the direction in which the light sources were arranged with respect to the light guide plate was less than −45° and more than 45°. Thus, diffusing property was poor.

DESCRIPTION OF REFERENCE SIGNS

1 . . . Backlight device
10 . . . Light guide plate
11 . . . Light source
12 . . . Light diffusion sheet
13 . . . Prism sheet
20 . . . Light diffusion member

The invention claimed is:

1. An edge light-type backlight device comprising:
a light guide plate;
a light source disposed at one end portion of the light guide plate; and
a light diffusion sheet and a prism sheet successively disposed on a light-emitting surface of the light guide plate, wherein:
the prism sheet has a refractive index of more than 1.60;
a peak of an emitted light distribution on the light-emitting surface of the light diffusion sheet in a plane parallel to the one end portion of the light guide plate and orthogonal to the light-emitting surface is in angular ranges of 30 to 45° and −30 to −45° with respect to a normal direction of the light-emitting surface; and emitted light from the light-emitting surface of the light diffusion sheet is gradually decreased from the angular ranges of the peak of the emitted light distribution toward an emitting angle of −90° or 90° with respect to the normal direction.

2. The edge light-type backlight device according to claim 1, wherein:
a ratio of change of an amount of emitted light in an angular range of −40 to 40° from the normal direction with respect to an amount of emitted light in the normal direction is less than 30%.

3. The edge light-type backlight device according to claim 1, wherein:
the light diffusion sheet includes a diffusion layer on one surface of a transparent resin film; and
the diffusion layer includes a binder resin and particles with an average particle diameter of not more than 5 μm, the particles having a content ratio of 100 to 200 parts by weight with respect to 100 parts by weight of the binder resin.

4. The edge light-type backlight device according to claim 1, wherein the light diffusion sheet includes a back coat layer on a surface of the transparent resin film opposite to the surface on which the diffusion layer is provided,
the back coat layer containing nylon resin particles and/or silicone resin particles.

5. The edge light-type backlight device according to claim 2, wherein:
the light diffusion sheet includes a diffusion layer on one surface of a transparent resin film; and
the diffusion layer includes a binder resin and particles with an average particle diameter of not more than 5 μm, the particles having a content ratio of 100 to 200 parts by weight with respect to 100 parts by weight of the binder resin.

6. The edge light-type backlight device according to claim 2, wherein the light diffusion sheet includes a back coat layer on a surface of the transparent resin film opposite to the surface on which the diffusion layer is provided,
the back coat layer containing nylon resin particles and/or silicone resin particles.

7. The edge light-type backlight device according to claim 3, wherein the light diffusion sheet includes a back coat layer on a surface of the transparent resin film opposite to the surface on which the diffusion layer is provided,
the back coat layer containing nylon resin particles and/or silicone resin particles.

8. The edge light-type backlight device according to claim 5, wherein the light diffusion sheet includes a back coat layer on a surface of the transparent resin film opposite to the surface on which the diffusion layer is provided,
the back coat layer containing nylon resin particles and/or silicone resin particles.

9. A light diffusion member disposed on a light guide plate of an edge light-type backlight device including the light guide plate and a light source disposed at one end portion of the light guide plate, wherein:
the light diffusion member includes a prism sheet and a light diffusion sheet;
the prism sheet has a refractive index of more than 1.60;
a peak of an emitted light distribution on the light-emitting surface of the light diffusion sheet in a plane parallel to the one end portion of the light guide plate and orthogonal to the light-emitting surface is in angular ranges of 30 to 45° and −30 to −45° with respect to a normal direction of the light-emitting surface; and emitted light from the light-emitting surface of the light diffusion sheet is gradually decreased from the angular ranges of the peak of the emitted light distribution toward an emitting angle of −90° or 90° with respect to the normal direction.

10. The light diffusion member according to claim 9, wherein:
a ratio of change of an amount of emitted light in an angular range of −40 to 40° from the normal direction with respect to an amount of emitted light in the normal direction is less than 30%.

11. The light diffusion member according to claim 9, wherein:
the light diffusion sheet includes a diffusion layer on one surface of a transparent resin film; and
the diffusion layer includes a binder resin and particles with an average particle diameter of not more than 5 μm, the particles having a content ratio of 100 to 200 parts by weight with respect to 100 parts by weight of the binder resin.

12. The light diffusion member according to claim 9, wherein the light diffusion sheet includes a back coat layer on a surface of the transparent resin film opposite to the surface on which the diffusion layer is provided,
the back coat layer containing nylon resin particles and/or silicone resin particles.

13. The light diffusion member according to claim 10, wherein:
the light diffusion sheet includes a diffusion layer on one surface of a transparent resin film; and
the diffusion layer includes a binder resin and particles with an average particle diameter of not more than 5 μm, the particles having a content ratio of 100 to 200 parts by weight with respect to 100 parts by weight of the binder resin.

14. The light diffusion member according to claim 10, wherein the light diffusion sheet includes a back coat layer on a surface of the transparent resin film opposite to the surface on which the diffusion layer is provided,
the back coat layer containing nylon resin particles and/or silicone resin particles.

15. The light diffusion member according to claim 11, wherein the light diffusion sheet includes a back coat layer on a surface of the transparent resin film opposite to the surface on which the diffusion layer is provided,
the back coat layer containing nylon resin particles and/or silicone resin particles.

16. The light diffusion member according to claim 13, wherein the light diffusion sheet includes a back coat layer on a surface of the transparent resin film opposite to the surface on which the diffusion layer is provided,
the back coat layer containing nylon resin particles and/or silicone resin particles.

* * * * *